US005874177A

United States Patent [19]

Makita et al.

[11] Patent Number: 5,874,177

[45] Date of Patent: Feb. 23, 1999

[54] STRUT ALIGNING FIXTURE

[75] Inventors: Yoshio Makita; Tatsuo Yamaura; Mamoru Namikawa; Satoshi Yoshimura; Kenichi Honda, all of Mobara, Japan

[73] Assignee: Futaba Denshi Kogyo K.K., Mobara, Japan

[21] Appl. No.: 571,647

[22] Filed: Dec. 13, 1995

[30] Foreign Application Priority Data

Dec. 15, 1994 [JP] Japan .................................... 6-332911

[51] Int. Cl.$^{6}$ ........................................................ B32B 3/24

[52] U.S. Cl. ............................................ 428/596; 428/613

[58] Field of Search .................................... 428/596, 613, 428/615, 679, 685

[56] References Cited

U.S. PATENT DOCUMENTS

| | | | |
|---|---|---|---|
| 2,829,460 | 4/1958 | Golay | 41/46 |
| 3,423,261 | 1/1969 | Frantzen | 428/596 |
| 3,804,601 | 4/1974 | Kaplan | 428/596 |
| 3,883,315 | 5/1975 | Savolainen et al. | 428/596 |
| 4,374,707 | 2/1983 | Pollack | 428/596 |
| 4,528,070 | 7/1985 | Gamblin | 428/596 |
| 4,745,332 | 5/1988 | Tischer | 313/422 |
| 4,828,931 | 5/1989 | Ogawa et al. | 428/596 |
| 5,600,203 | 2/1997 | Namikawa et al. | 313/495 |
| 5,620,129 | 4/1997 | Rogren | 428/596 |

*Primary Examiner*—John J. Zimmerman

*Attorney, Agent, or Firm*—Oblon, Spivak, McClelland, Maier & Neustadt, P.C.

[57] ABSTRACT

A strut aligning fixture capable of improving misregistration of struts arranged between two glass plates for a vacuum glass envelope to hold the glass plates spaced from each other at a predetermined interval. An alignment plate is formed of a first alignment plate member of a small thickness and a second alignment plate member of a large thickness by lamination. The first alignment plate member is provided with strut holes, which can be formed with high accuracy because of a reduced thickness of the first alignment plate member. The alignment plate is used as a fixture for arranging the struts in the vacuum glass envelope while minimizing misregistration of the struts.

2 Claims, 9 Drawing Sheets

STRUT ALIGNING FIXTURE

BACKGROUND OF THE INVENTION

1. Field of the Invention

This invention relates to a vacuum glass envelope formed of at least two glass substrates and more particularly to an envelope suitable for use for a display device.

2. Discussion of the Background

An envelope for a display device in which an electron emission source and illuminants or luminous elements such as phosphors or the like is generally constructed in the form of a vacuum glass envelope. Conventionally, the vacuum glass envelope is formed of a first glass substrate and a second glass substrate arranged in a manner to be opposite to the first glass substrate and provided therein with illuminants or luminous elements providing a display plane and an electron source for exciting the illuminants for luminescence. The first and second glass substrates are arranged so as to be spaced from each other at a predetermined interval by means of struts interposedly arranged therebetween.

Such construction of the conventional envelope is as shown in FIG. 7, wherein struts 101 are interposedly arranged between a first substrate 102 and a second substrate 103. The struts 101 each are formed into a diameter of about 50 $\mu$m and a length of about 200 $\mu$m.

Now, an arrangement of the struts 101 between the first substrate 102 and the second substrate 103 will be described hereinafter with reference to FIGS. 6(*a*) to 6(*c*).

First, a glass fiber which is, for example, about 50 $\mu$m in diameter which is a material for each of the struts 101 is cut into a length of, for example, about 200 $\mu$m.

The struts 101 thus cut each are then washed and subject to positioning on the first substrate 102 by means of a fixture 110.

The fixture 110, as shown in FIG. 6(*a*), is formed into a box-like shape and includes an alignment plate 111 provided with strut holes 114 for receiving the cut struts 101 therein while raising them, a porous section 112 made of a porous material and arranged under the alignment plate 111, and an evacuation section 113 through which the fixture 110 is evacuated.

The strut holes 114 are formed on the alignment plate 111 in a manner to positionally correspond to arrangement of the struts 101 on the first substrate 102.

In the fixture 110 thus constructed, the evacuation section 113 is connected to a pump (not shown) to cause the interior of the fixture 110 to be evacuated therethrough, during which the cut struts 101 are spread on the alignment plate 111 of the fixture 110. This causes gas sucked though the strut holes 114 to be passed through the porous section 112 and evacuated from the evacuation section 113, so that the cut struts 110 each are caused to enter, by suction, the strut hole 114 formed into a diameter somewhat larger than that of the strut 101 while being raised, resulting in being arranged in the strut hole 114 while being kept raised, as shown in FIG. 6(*a*).

Then, as shown in FIG. 6(*b*), a glass substrate 120 to which a transfer paste 121 is applied is placed on the fixture 110 while keeping the paste 121 facing the fixture and then contacted with the struts 101 held in the fixture 110, so that the transfer paste 121 may be transferred to an upper or one end surface of each of the struts 101.

Subsequently, as shown in FIG. 6(*c*), the first substrate 102 is placed on the fixture 110 in which the struts 101 having the transfer paste 121 thus transferred thereto are held while being aligned with the fixture 110, so that the struts 101 are attached at the one end surface thereof to the first substrate 102. Then, the first substrate 102 is subject to calcination at a predetermined temperature to melt the transfer paste 121, to thereby fix the one end surface of each of the struts 101 to the first substrate 102 by welding.

The transfer paste 121 mainly consists of a sealing glass of a low softening point which has lead oxide incorporated therein so as to permit a thermal expansion coefficient of the transfer paste 121 approach to that of the first substrate 102 made of glass and may optionally contain a solvent and the like, resulting in exhibiting stickiness.

Thereafter, the second substrate 103 is arranged in a manner to be opposite to the first substrate 102 to which the struts 101 are fixed in a manner to be spaced from each other at predetermined intervals, resulting in a glass envelope being provided. Then, the glass envelope is evacuated to vacuum, so that a vacuum glass envelope in which the struts 101 are firmly held between the first substrate 102 and the second substrate 103 by an atmospheric pressure is provided as shown in FIG. 7.

Alternatively, the vacuum glass envelope may be prepared in a different way. More particularly, the transfer paste 121 is transferred to the other end surface of the struts 101 and the first and second substrates 102 and 103 are laid on each other while being aligned with each other. Then, the substrates 102 and 103 are placed in an oven, resulting in being sealedly joined to each other. Concurrently, this causes the transfer paste 121 to be melted, to thereby fix the other end surface of the struts 101 to the second substrate 103, so that the glass envelope may be provided in which the struts 101 are arranged between the substrates 102 and 103.

In order to ensure that the first substrate 102 and second substrate 103 are arranged in a manner so as to be opposite to each other at a predetermined interval, side plates of a predetermined height, glass beads, glass fibers or the like are interposed therebetween while being positioned at a periphery thereof. Then, the above-described sealing operation is carried out for providing the glass envelope.

The struts 101 are arranged in the glass envelope in a manner to be spaced from each other at intervals of about 2 to 5 mm.

Arrangement of the struts 101 in the strut holes of the alignment plate 111 which is carried out as described above is shown in FIGS. 8(*a*) and 8(*b*). As will be noted from FIG. 8(*a*) and particularly FIG. 8(*b*), it is often seen that the struts 101 are each arranged in the strut hole while being inclined or positionally deviated with respect to the strut hole.

One of the reasons is that when the strut hole into which the strut 101 is inserted is formed into a diameter of about 53 $\mu$m in order to permit a slight gap which is sufficient to prevent the strut 101 from being caught in the hole to be provided between the strut hole and the strut, the strut 101 and strut hole are caused to have tolerances as large as +3 $\mu$m and +5 to 0 $\mu$m, respectively.

Another reason is that preparation of the alignment plate 11 with increased accuracy fails to form it into a thickness of about 70 $\mu$m or more, to thereby cause the struts 101 to be projected from the alignment plate 111 by a distance as large as about 130 $\mu$m.

Thus, the struts 101 are each caused to be positionally deviated or misregistered with respect to the strut hole by a magnitude up to about 20 $\mu$m. When the vacuum glass envelope is used for a display device in which a picture cell pitch and a picture cell interval are respectively defined to be 360 μm and 80 μm, such misregistration in an amount as large as about 20 μm causes the strut 101 to interrupt display operation of a display section or leads to short circuit of electric wirings in the display device.

The reason why the conventional vacuum glass envelope fails to form the alignment plate 111 into a thickness of about 70 μm or more is due to the way in which the alignment plate is prepared.

Now, preparation of the alignment plate 111 will be described hereinafter with reference to FIGS. 9(*a*) to 9(*d*), as well as FIGS. 10(*a*) and 10(*b*).

First, a photoresist 132 is applied to a stainless steel plate 131 as shown in FIG. 9(*a*) and then a glass dry plate 133 having a mask 134 wholly formed thereon is placed on the photoresist 132, followed by irradiation of light to the glass dry plate 133, to thereby subject the photoresist 132 to exposure, as shown in FIG. 9(*b*). Then, the photoresist 132 is developed, resulting in only portions 135 of the photoresist exposed to light being left on the stainless steel plate 131, as shown in FIG. 9(*c*).

Such photoresist portions 135 thus left are formed in large numbers on the stainless steel plate 131 and positions of the photoresist portions 135 left on the plate 131 are determined to be positions at which the struts 101 are to be arranged while being raised.

Then, the stainless steel plate 131 is subject to electroplating while using Ni as a plating material, so that a Ni plate 136 is formed on only the stainless plate 131 as shown in FIG. 9(*d*).

Thereafter, the photoresist 135 is removed from the stainless steel plate 131, resulting in the Ni plate 136 which is formed with a strut hole 137 being formed on the stainless steel 131, as shown in FIG. 10(*b*). Then, the Ni plate 136 is peeled off from the stainless steel plate 131, so that the alignment 111 is provided which is formed with a plurality of such strut holes 137 as shown in FIG. 10(*b*).

The thickness of the alignment plate 111 may be increased by increasing a thickness of the photoresist 132 applied to the stainless plate 131. Unfortunately, such an increase in thickness of the photoresist 132 substantially prevents light irradiated for exposure from reaching the depths of the photoresist 132, leading to a failure to fully expose it to light. Also, the light irradiated is diffracted at a boundary between the mask 134 and the photoresist 132 and scattered in the photoresist 132, therefore, an increase in thickness of the alignment plate 111 causes light to be gradually diffused as it penetrates through the photoresist 132. This causes the photoresist 135 subjected to exposure as shown in FIG. 9(*b*) to have a configuration like a trapezoid-like shape, so that a variation in dimension of the strut hole 137 formed is increased with an increase in thickness of the alignment plate 111, as shown in FIG. 11.

Such an increase in variation of dimension of the strut hole or formation of the strut hole into a trapezoid-like shape undesired further promotes misregistration of the strut 101 from a center of the strut hole to a degree sufficient to cause the vacuum glass envelope to be unsuitable for use for a display device.

Thus, it will be noted that the prior art fails to increase a thickness of the alignment plate 111 to about 70 μm or more while ensuring formation of the strut holes with satisfactory accuracy.

SUMMARY OF THE INVENTION

The present invention has been made in view of the foregoing disadvantage of the prior art.

Accordingly, it is an object of the present invention to provide a strut aligning fixture which is capable of minimizing positional deviation or misregistration of struts.

It is another object of the present invention to provide a method for producing a strut aligning fixture which is capable of providing a strut aligning fixture minimizing misregistration of struts.

In accordance with one aspect of the present invention, a strut aligning fixture is provided for interposedly arranging struts between at least two glass plates constituting a vacuum glass envelope, to thereby hold the glass plates opposite to each other and spaced from each other at a predetermined interval. The strut aligning fixture includes an alignment plate including a first alignment plate member and a second alignment plate member laminated on the first alignment plate member. The first alignment plate member is formed into a small thickness and has a plurality of first strut holes for raising the struts provided with high accuracy and the second alignment plate member is provided with a plurality of second strut holes. The first and second alignment plate members are laminated on each other while keeping the first and second strut holes aligned with each other.

In a preferred embodiment of the present invention, the second strut holes of the second alignment plate member are formed with a diameter larger than that of the first strut holes of the first alignment plate member.

In a preferred embodiment of the present invention, the strut aligning fixture further includes a porous section and an evacuation section arranged under the porous section. The alignment plate is arranged on the porous section.

In accordance with another aspect of the present invention, a method is provided for producing a strut aligning fixture for interposedly arranging struts between at least two glass plates constituting a vacuum glass envelope, to thereby hold the glass plates opposite to each other and spaced from each other at a predetermined interval. The method comprises the steps of subjecting a surface of a metal plate on which a first resist is formed at each of positions thereof at which the struts are to be raised to plating, to thereby provide the first alignment plate member formed with first strut holes for arranging the struts therein while keeping the struts raised and forming a second resist while aligning the second resist with each of the first strut holes and subjecting it to plating, to thereby provide the second alignment plate member formed with second strut holes while laminating it on the first alignment plate member.

In a preferred embodiment of the present invention, the second resist is formed into a diameter larger than that of the first resist.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DESCRIPTION OF THE PREFERRED EMBODIMENTS

Now, the present invention will be described hereinafter with reference to the accompanying drawings.

Figure 1:
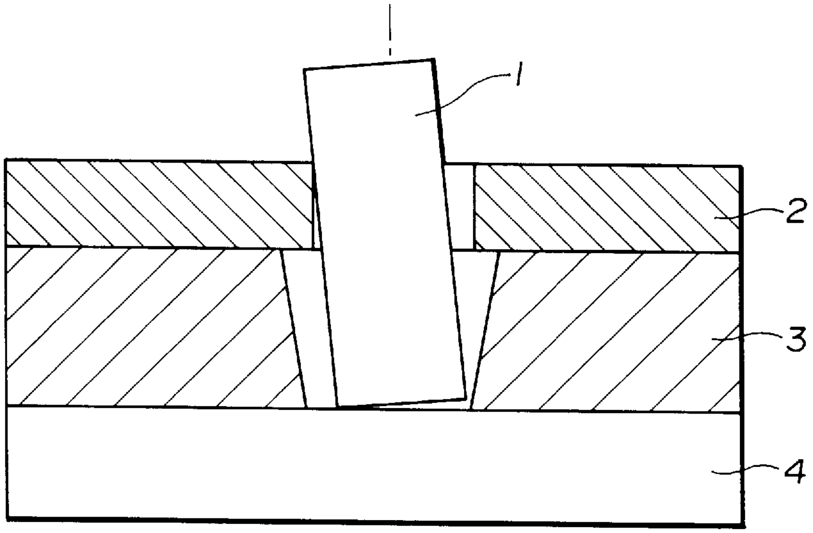
FIG. 1 is a schematic sectional view showing an embodiment of an alignment plate suitable for use for a strut aligning fixture according to the present invention.
Figure 6A:
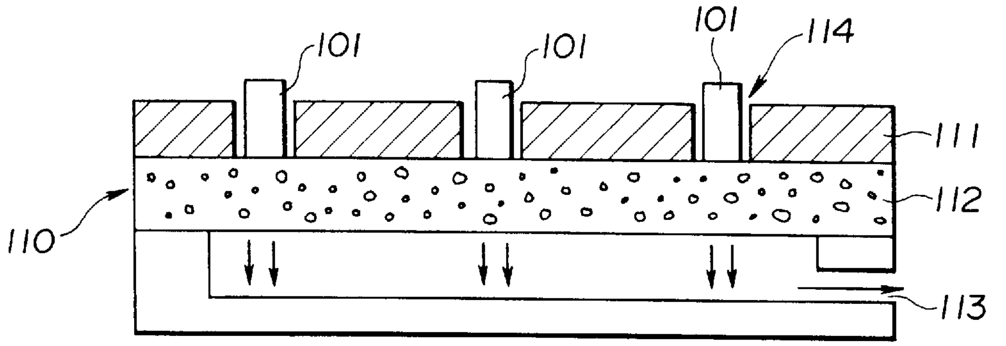
FIGS. 6(*a*) to 6(*c*) each are a schematic sectional view showing arrangement of a strut aligning fixture according to the present invention and the manner of use of the strut aligning fixture.
Figure 6B:
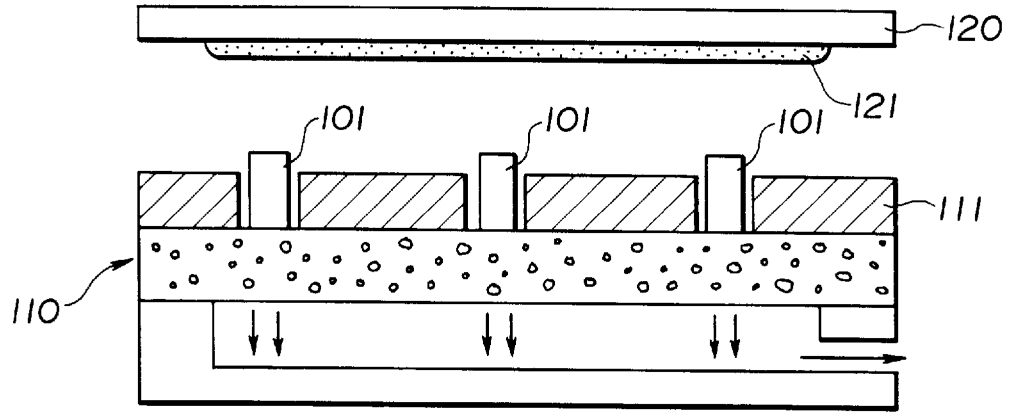
Figure 6C:
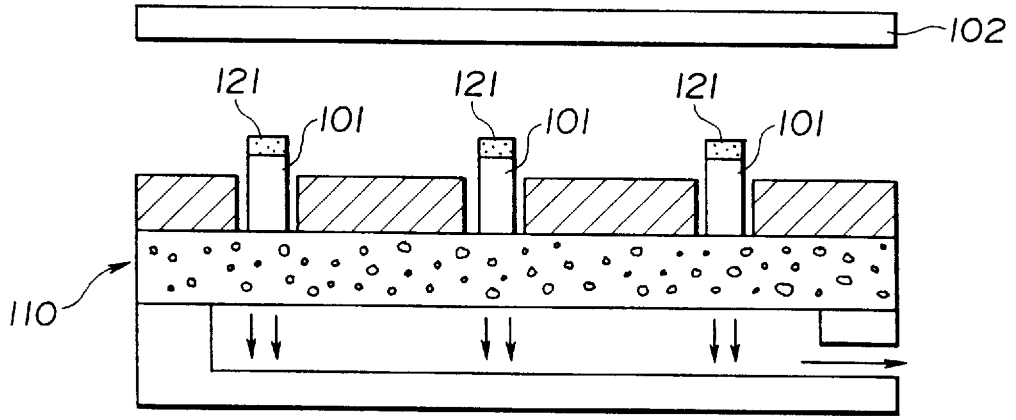
Figure 7:
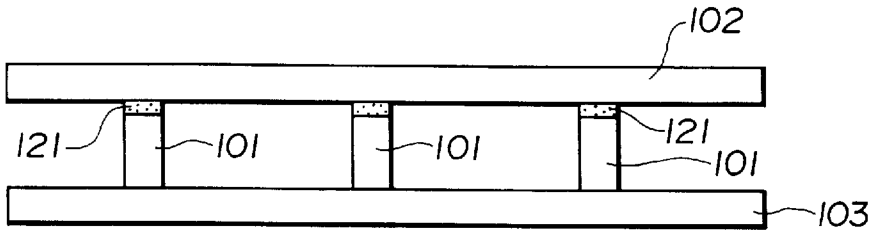
FIG.7 PRIOR ART
FIG. 7 is a schematic view showing a vacuum glass envelope.
Figure 8A:
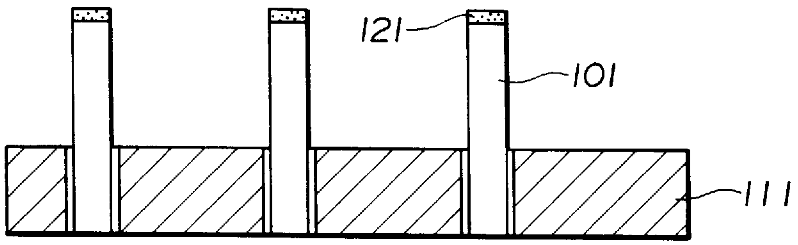
FIG.8(a) PRIOR ART
FIGS. 8(*a*) and 8(*b*) each are a schematic view showing positional deviation or misregistration of a strut.
Figure 8B:
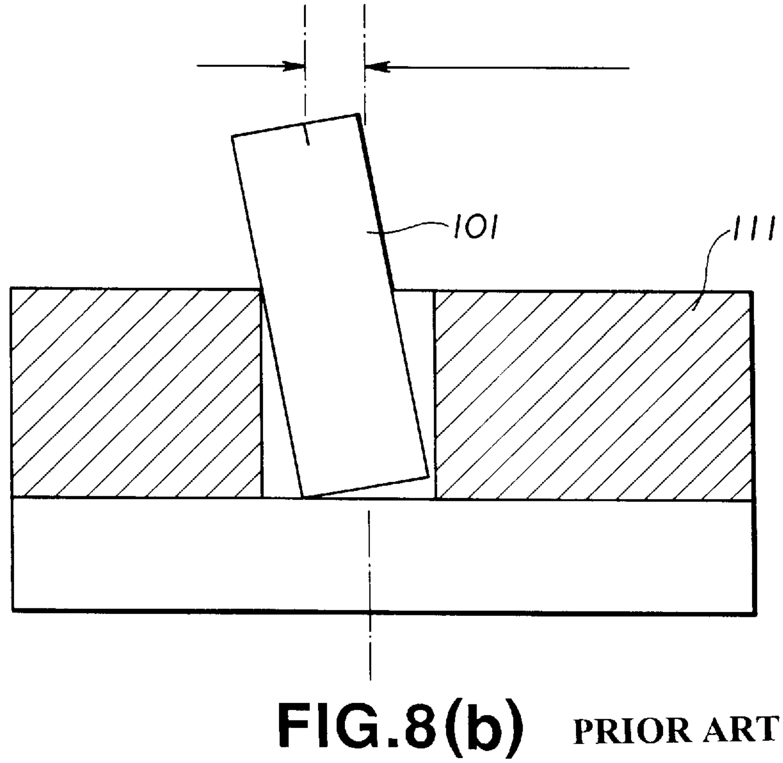
FIG.8(b) PRIOR ART
Figure 9A:
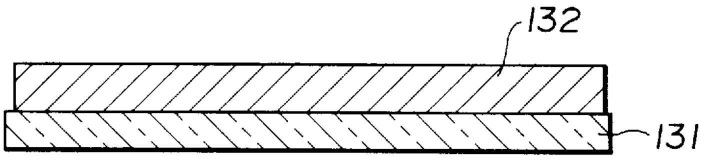
FIG.9(a) PRIOR ART
FIG. 9(*a*) to 9(*d*) each are a schematic sectional view showing each of steps in a conventional method for producing an alignment plate.
Figure 9B:
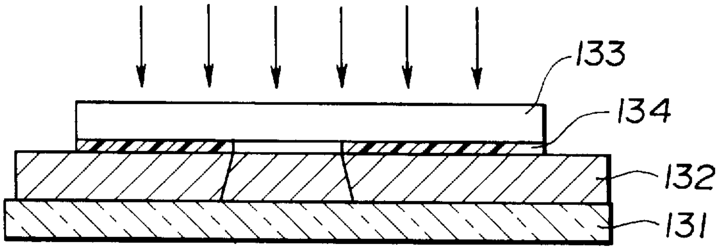
FIG.9(b) PRIOR ART
Figure 9C:
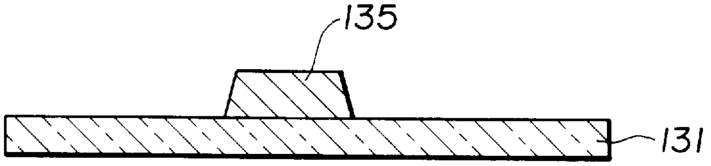
FIG.9(c) PRIOR ART
Figure 9D:
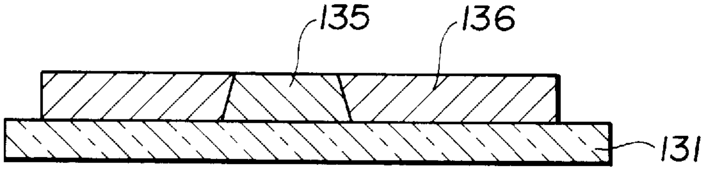
FIG.9(d) PRIOR ART
Figure 10A:
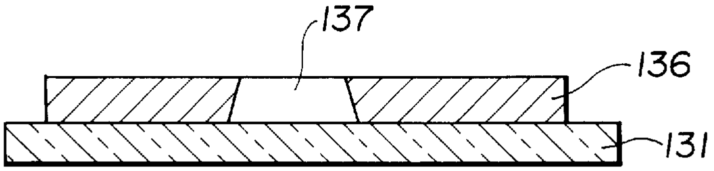
FIG.10(a) PRIOR ART
FIG. 10(*a*) and 10(*b*) each are a schematic sectional view showing each of further steps in a conventional method for producing an alignment plate.
Figure 10B:
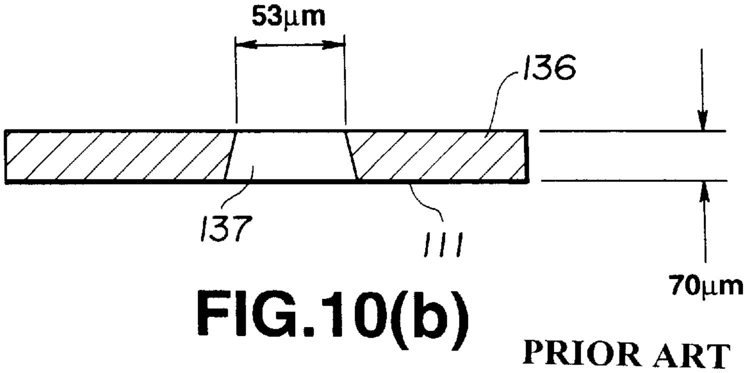
FIG.10(b) PRIOR ART

Referring first to FIG. 1, a first embodiment of an alignment plate suitable for use for a strut aligning fixture according to the present invention is illustrated. In FIG. 1, reference numeral 1 designates struts arranged between a first glass substrate and a second glass substrate for a vacuum glass envelope for a display device in a manner to be spaced from each other at predetermined intervals, so that the first and second glass substrates are held spaced from each other at a predetermined distance while being kept opposite to each other. Reference number 2 denotes a first alignment plate member for an alignment plate used for the strut aligning fixture 110 described above with reference to FIGS. 6(*a*) to 6(*c*). Reference number indicates a second alignment plate member which is formed under the first alignment plate member 2 and cooperates with the first alignment plate member 2 to constitute the alignment plate. Reference number 4 denotes a porous base or support on which the alignment plate constituted by the first and second alignment plate members 2 and 3 is arranged.

Figure 11:
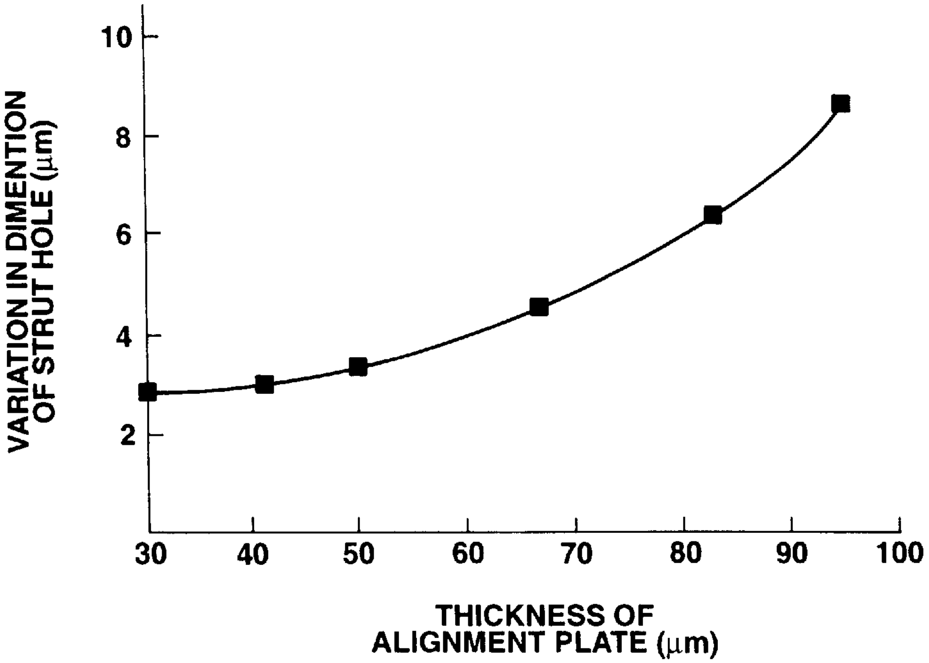
FIG. 11 is a graphical representation showing relationship of a variation in dimension of a strut hole to a thickness of an alignment plate.
Figure 12:
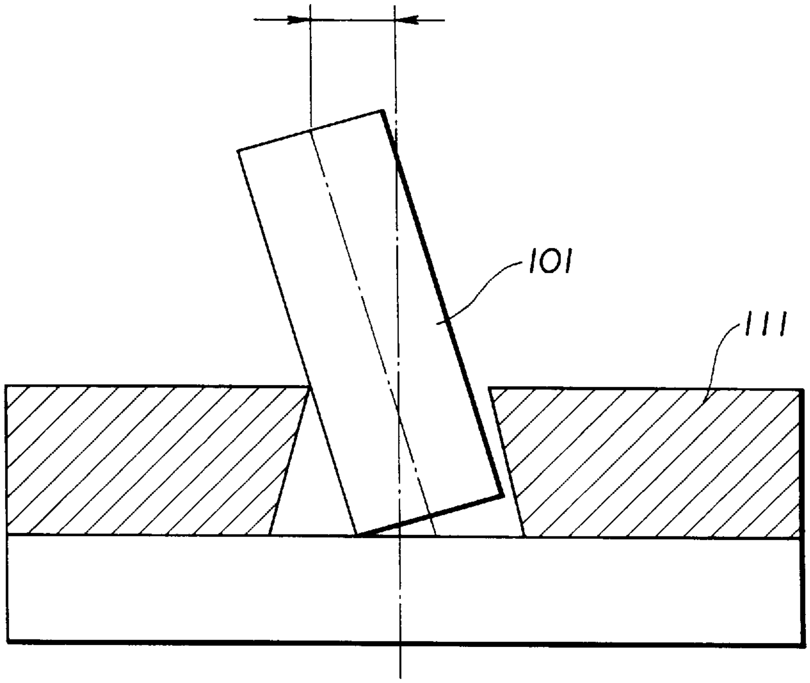
FIG.12 PRIOR ART
FIG. 12 is a schematic view showing misregistration of a strut with respect to a strut hole in a prior art.

The alignment plate of the first embodiment is formed by laminating the first alignment plate member 2 and second alignment plate member 3 on each other. The second alignment plate member 3 on a lower side is formed into a thickness larger than that of the first alignment plate member 2 on an upper side. Such construction of the first embodiment permits a variation in dimension of strut holes formed in the first alignment plate member 2 to be reduced, although it causes a variation in dimension of strut holes formed in the second alignment plate member 3 to be increased as shown in FIG. 11.

Thus, misregistration of each of the struts 1 received in the strut holes is substantially regulated by the strut holes formed in the first alignment plate member 2, so that the second alignment plate member 2 formed with the strut holes with high accuracy significantly reduces misregistration of each of the struts 1 from a center of the corresponding strut holes.

Also, the alignment plate is formed by laminating the first and second alignment plate members 2 and 3 on each other. Such formation of the alignment plate permits the thickness of the plate to be increased, to thereby reduce projection of each of the struts 1 from the alignment plate, resulting in further reducing the misregistration of the strut 1.

For example, supposing that the second alignment plate member 3 is formed into a thickness of about 130 μm and the first alignment plate member 2 is formed into a thickness of about 30 μm, the amount of projection of the strut from the alignment plate is limited to a level as small as about 40 μm, so that the amount of misregistration in the illustrated embodiment is decreased to a level as small as about 10 μm or less. Thus, it will be noted that the illustrated embodiment substantially reduces the misregistration as compared with the prior art.

Alternatively, the illustrated embodiment may be so constructed that the first alignment plate member 2 is arranged under the second alignment plate member 3.

Figure 2:
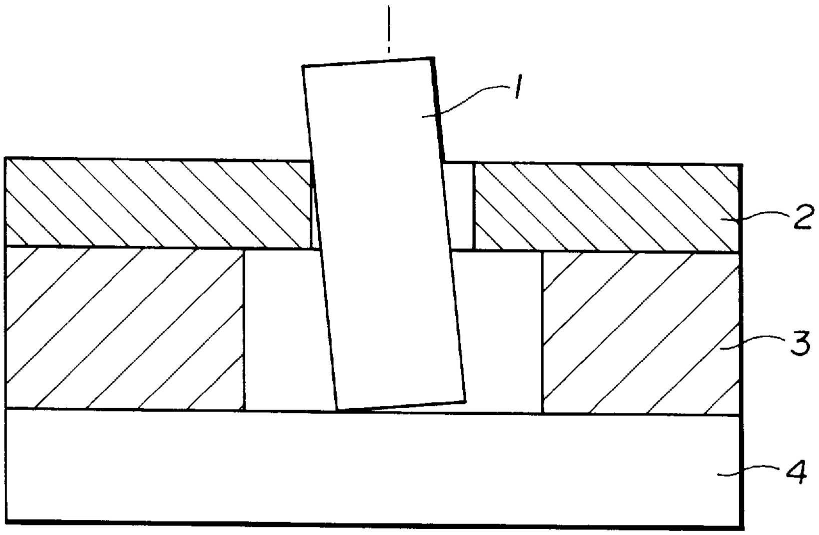
FIG. 2 is a schematic sectional view showing another embodiment of an alignment plate suitable for use for a strut aligning fixture according to the present invention.
Figure 3A:
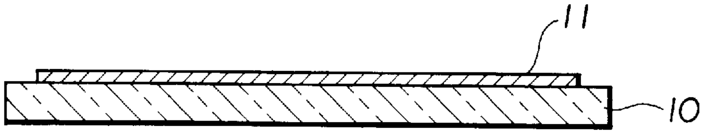
FIGS. 3(*a*) to 3(*e*) each are a schematic sectional view showing each of steps in a method for producing the alignment plate shown in FIG. 1.
Figure 3B:
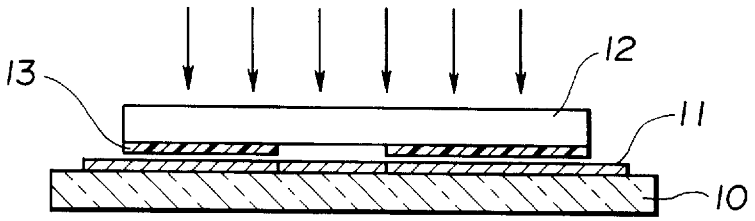
Figure 3C:
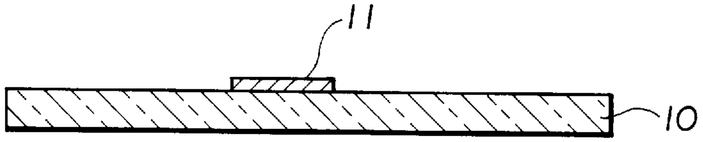
Figure 3D:
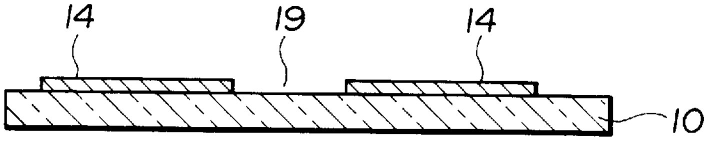
Figure 3E:
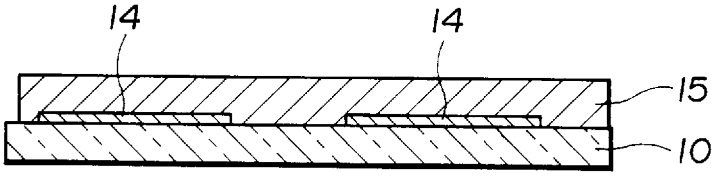
Figure 4A:
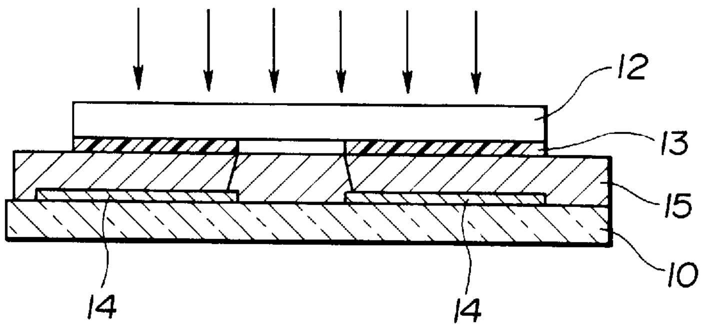
FIGS. 4(*a*) to 4(*d*) each are a schematic sectional view showing each of further steps in a method for producing the alignment plate shown in FIG. 1.
Figure 4B:
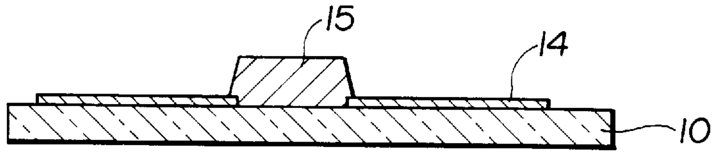
Figure 4C:
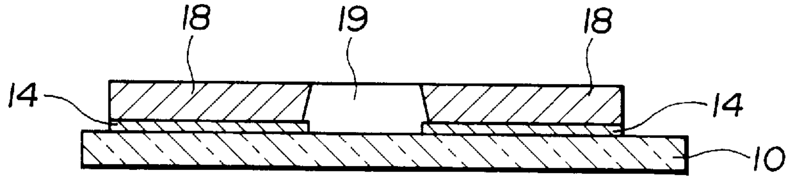
Figure 4D:
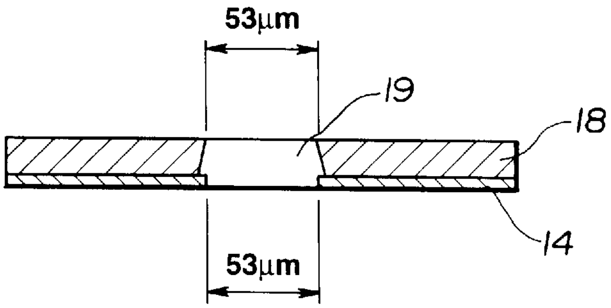
Figure 5A:
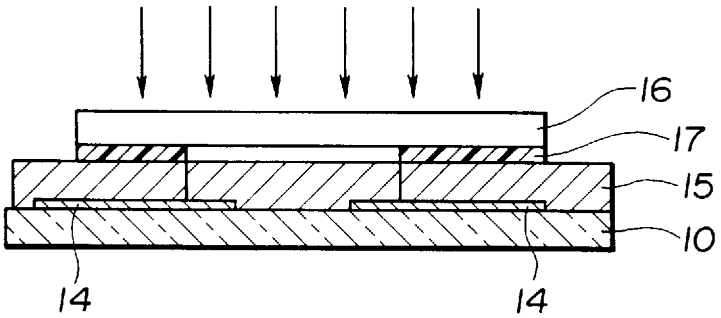
FIGS. 5(*a*) to 5(*d*) each are a schematic sectional view showing each of steps in a method for producing the alignment plate shown in FIG. 2.
Figure 5B:
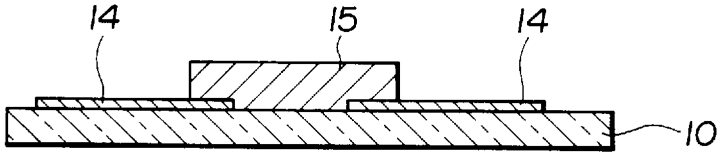
Figure 5C:
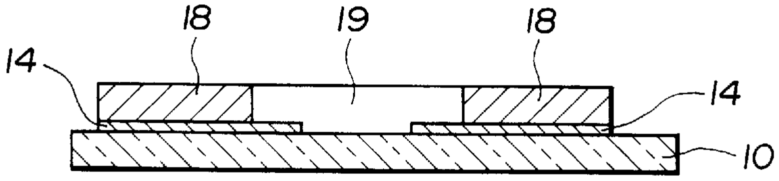
Figure 5D:
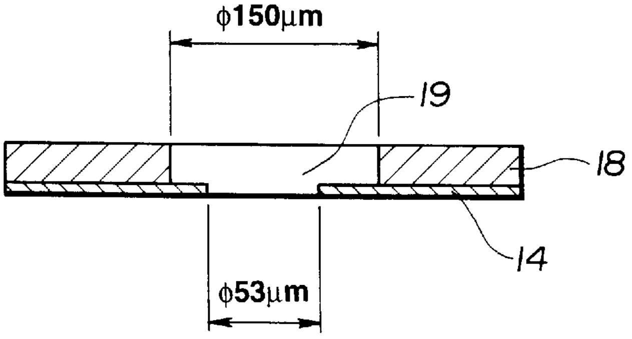

Referring now to FIG. 2, a second embodiment of an alignment plate suitable for use for a strut aligning fixture according to the present invention is illustrated. Likewise, in FIG. 2, reference numeral 1 designates struts arranged between a first glass substrate and a second glass substrate for a vacuum glass envelope for a display device in a manner to be spaced from each other at predetermined intervals, so that the first and second glass substrates are held spaced from each other at a predetermined distance while being kept opposite to each other. Reference numeral 2 is a first alignment plate member for an alignment plate used for the strut aligning fixture 110 described above with reference to FIGS. 6(*a*) to 6(*c*). Reference number 3 denotes a second alignment plate member which is arranged under the first alignment plate member 2 and cooperates with the first alignment plate member 2 to constitute the alignment plate. 4 is a porous base or support on which the alignment plate constituted by the first and second alignment plate members 2 and 3 is arranged.

In the second embodiment, the second alignment plate member 3 is formed with strut holes larger than those of the second alignment plate member 3 in the first embodiment described above. This permits alignment of the second alignment plate member 3 with the first alignment plate member 2 to be further facilitated when the second alignment plate member 3 is laminated on the first alignment plate member 2 for preparation of the alignment plate.

The remaining part of the second embodiment may be constructed in substantially the same manner as the first embodiment described above.

Thus, it will be noted that the second embodiment reduces misregistration of the struts 1 from a center of the corresponding strut holes as in the first embodiment described above.

Now, manufacturing of the alignment plate of the first embodiment described above will be described hereinafter with reference to FIGS. 3(*a*) to 4(*d*).

First, as shown in FIG. 3(*a*), a first resist 11 is thinly applied on a stainless steel plate 10, resulting in being formed into a thickness of 50 μm or less (for example, 30 μm). Then, a glass dry plate 12 having a first mask 13 formed on a whole surface thereof is arranged on the first resist 11 while keeping the first mask 13 facing the resist 11, as shown in FIG. 3(*b*). Then, light is downwardly irradiated to the glass dry plate 12, resulting in the first resist 11 being exposed to the light. The first resist 11 is subject to development, so that only exposed portions of the first resist 11 are left on the stainless steel plate 10 as shown in FIG. 3(*c*).

The exposed portions of the first resist 11 are formed into a substantially circular shape and in large numbers on the stainless steel plate 10. Positions at which the struts 1 are to be arranged while being raised are determined so as to correspond to positions of the resist portions left on the plate 10.

Then, the stainless steel plate 10 is subject to electroplating while using Ni as a plating material, so that a first Ni plate 14 is formed on only the stainless plate 10.

Thereafter, the resist 11 is removed from the stainless steel plate 10, resulting in the first Ni plate 14 which is formed with strut holes 19 being formed on the stainless steel 10 with high accuracy, as shown in FIG. 3(*d*).

Subsequently, a second resist 15 is applied to the first Ni plate 14 so as to have a thickness of 100 $\mu$m or more, as shown in FIG. 3(*e*). For example, the application may be carried out so as to form the second resist 15 into a thickness of 130 $\mu$m. Then, the above-described glass dry plate 12 formed thereon with the first mask 13 is put on the second resist 15 while being aligned with strut holes 19, followed by downward irradiation of light, resulting in the second resist 15 being exposed to the light, as shown in FIG. 4(*a*). Thus, the illustrated embodiment uses only one such mask, so that a center of each of holes formed at the mask is maintained with high accuracy. Also, the illustrated embodiment eliminates a necessity of exchange of the mask, to thereby eliminate occurrence of an error due to the exchange.

Then, the second resist 15 is subject to development, so that portions of the second resist 15 exposed to light are left on the second Ni plate 14 as shown in FIG. 4(*b*).

Subsequently, the stainless steel plate 10 is subject to electroplating using Ni as a plating material, so that a second Ni plate 18 may be formed on only the Ni plate 14. Then, the second resist 15 is removed, so that the second Ni plate 18 is laminatedly formed on the first Ni plate 14 while ensuring that each of the strut holes 19 is formed through the first and second Ni plates 14 and 18 in a manner to be common to both plates, as shown in FIG. 4(*c*).

Thereafter, the first and second Ni plates 14 and 18 laminated together are peeled off from the stainless steel plate 10, resulting in the alignment plate formed with the strut holes 19 in large numbers being provided as shown in FIG. 4(*d*).

Supposing that the struts 1 each are formed into a diameter of about 50 $\mu$m and a length of about 200 $\mu$m, the first Ni plate 14 may be formed into a thickness of about 30 $\mu$m and the strut holes 19 of the first Ni plate 14 may be formed into a diameter of about 53 $\mu$m. Also, the second Ni plate 18 may be formed into a thickness of about 130 $\mu$m and the strut holes 19 of the second Ni plate 18 may be formed into a diameter of about 53 $\mu$m.

Now, manufacturing of the alignment plate of the above-described second embodiment which is used for the strut aligning fixture of the present invention will be described hereinafter with reference to FIGS. 5(*a*) to 5(*d*). In the manufacturing, steps extending from formation of the first Ni plate 14 to application of the second resist 15 to the Ni plate 14 may be carried out in substantially the same manner as in the above-described manufacturing of the alignment plate of the first embodiment. Thus, FIG. 5(*a*) is supposed to show a step subsequent to the step shown in FIG. 3(*e*). Also, the steps shown in FIGS. 5(*a*) to 5(*d*) are carried out in substantially the same manner as those shown in FIGS. 4(*a*) to 4(*d*), except that a second resist 15 is formed into a diameter different from that in FIGS. 4(*a*) to 4(*d*). Thus, the following description will be made in connection with formation of the second resist 15.

More particularly, holes of a second mask 17 arranged all over a glass dry plate 16 are formed into a diameter larger than that of the holes of the first mask 13 described above. Formation of the holes of the second mask 17 into such a larger diameter facilitates arrangement of the second mask 17 on the first Ni plate 14 while aligning each of strut holes 19 of the first Ni plate 14 with each of the holes of the second mask 17.

Supposing that the strut holes 19 of the first Ni plate 14 are formed into a diameter of 53 $\mu$m, the holes of the second mask 17 may be formed into a diameter of 100 $\mu$m or more, for example, about 150 $\mu$m.

In each of the embodiments described above, the first and second alignment plate members each are made of Ni. However, the plate members may be conveniently made of any other suitable metal material.

Also, the first and second alignment plate members each are made by electroplating. Alternatively, the alignment plate may be made in such a manner that the first alignment plate member is formed by electroplating and then a metal plate of about 130 $\mu$m in thickness which is formed with holes of about 200 $\mu$m in diameter by etching is laminated on the first alignment plate member.

The struts each may be formed into a height of 150 to 500 $\mu$m supposing that it is formed into a diameter of about 50 $\mu$m. Also, it is desirable that the alignment plate is preferably formed into a thickness about one third as large as a height of the struts and the struts are arranged between a first substrate and a second substrate so as to be spaced from each other at intervals of about 2 mm. Further, the struts may be formed into a spherical shape as in beads other than a column-like shape.

As can be seen from the foregoing, in the present invention, the alignment plate is constructed into a two-layer structure, wherein the alignment plate member arranged on the upper side is formed into a reduced thickness, so that the alignment plate may be formed with the strut holes with high accuracy, resulting in minimizing misregistration of the struts when they are arranged in the vacuum glass envelope.

Thus, it will be noted that the present invention permits the struts to be arranged at predetermined positions without adversely affecting components of the display device. Thus, the present invention effectively prevents the struts from interrupting display of the display device and leading to short circuit of internal electric wirings in the display device.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A strut aligning fixture for defining an array of struts in a flat panel display; comprising:

a porous substrate;

an alignment plate arranged on said porous substrate, said alignment plate including a first alignment plate member and a second alignment plate member laminated on said first alignment plate member;

said first alignment plate member being formed into a small thickness and having a plurality of first holes corresponding to said array of struts in said flat panel display for holding said struts in said holes resting on said porous substrate at one end thereof and projecting at a free end thereof above said first alignment plate, said struts being arranged in said flat panel display for spacing a screen of said flat panel display from a backplate of said display;

said second alignment plate member being provided with a plurality of second holes;

said first and second alignment plate members being laminated on each other while keeping said first and second holes aligned with each other for permitting said struts to pass through said first and second holes; and an evacuation section arranged under said porous section for causing said struts to enter into said first and second holes by suction.

2. A strut aligning fixture as defined in claim 1, wherein said second holes of said second alignment plate member are formed with a diameter larger than that of said first holes of said first alignment plate member.

* * * * *